US007320088B1

(12) United States Patent
Gawali

(10) Patent No.: US 7,320,088 B1
(45) Date of Patent: Jan. 15, 2008

(54) SYSTEM AND METHOD TO AUTOMATE REPLICATION IN A CLUSTERED ENVIRONMENT

(75) Inventor: Ashish L. Gawali, Pune (IN)

(73) Assignee: VERITAS Operating Corporation, Mountain View, CA (US)

( * ) Notice: Subject to any disclaimer, the term of this patent is extended or adjusted under 35 U.S.C. 154(b) by 610 days.

(21) Appl. No.: 11/023,729

(22) Filed: Dec. 28, 2004

(51) Int. Cl.
*G06F 11/00* (2006.01)
(52) U.S. Cl. .......................................... 714/6; 709/219
(58) Field of Classification Search ................ 714/6, 714/5, 13, 15; 709/219, 244; 707/203, 204, 707/205
See application file for complete search history.

(56) References Cited

U.S. PATENT DOCUMENTS

| 6,134,673 | A | 10/2000 | Chrabaszcz |
| 6,173,420 | B1 | 1/2001 | Sunkara |
| 6,195,760 | B1 | 2/2001 | Chung et al. |
| 6,360,331 | B2 * | 3/2002 | Vert et al. ....................... 714/4 |
| 6,363,497 | B1 | 3/2002 | Chrabaszcz |
| 6,859,834 | B1 * | 2/2005 | Arora et al. ................. 709/227 |
| 7,035,858 | B2 * | 4/2006 | Dinker et al. ................. 707/10 |
| 7,124,320 | B1 * | 10/2006 | Wipfel ......................... 714/13 |
| 7,155,466 | B2 * | 12/2006 | Rodriguez et al. .......... 707/205 |
| 2002/0091814 | A1 | 7/2002 | Arendt et al. |
| 2003/0078946 | A1 | 4/2003 | Costello et al. |
| 2003/0204273 | A1 | 10/2003 | Darpan et al. |
| 2003/0204509 | A1 | 10/2003 | Darpan et al. |
| 2003/0204786 | A1 | 10/2003 | Darpan et al. |
| 2004/0025079 | A1 | 2/2004 | Srinivasan et al. |
| 2004/0088396 | A1 * | 5/2004 | Hammons et al. ........... 709/223 |
| 2004/0148397 | A1 | 7/2004 | Aronoff et al. |
| 2004/0153719 | A1 | 8/2004 | Kyosuke et al. |
| 2005/0010588 | A1 * | 1/2005 | Zalewski et al. ............ 707/102 |
| 2005/0081156 | A1 * | 4/2005 | Clark et al. .................. 715/736 |
| 2005/0120025 | A1 * | 6/2005 | Rodriguez et al. ............. 707/10 |

OTHER PUBLICATIONS

Swaminathan Sivasubramanian, et al., "GlobeDB: Autonomic Data Replication for Web Applications," Proceedings of the 14th International Conference on Wold Wide Web, 2005, 10 pages.

* cited by examiner

*Primary Examiner*—Nadeem Iqbal
(74) *Attorney, Agent, or Firm*—Robert C Kowert; Meyertons, Hood, Kivlin, Kowert & Goetzel, P.C.

(57) ABSTRACT

Replication of application files in a clustered environment may be automated based on the state and/or configuration of the application in the cluster. A clustering engine executing on one or more clustered computing nodes may notify one or more replication agents regarding changes in a clustered application's state and/or configuration. An application's status may include information indicating one or more cluster nodes on which the application is currently executing and also may include information indicating one or more cluster nodes on which the application is configured to execute. Replication agents executing on cluster nodes may, either individually or through collective coordination, modify a replication policy for replicating one or more application files based on the received status information. Subsequently, the replication agents may replicate the application files from one of the clustered computing nodes to one or more other nodes, according to the modified replication policy.

21 Claims, 10 Drawing Sheets

SYSTEM AND METHOD TO AUTOMATE REPLICATION IN A CLUSTERED ENVIRONMENT

BACKGROUND OF THE INVENTION

1. Field of the Invention

This invention relates to replication in general and, more particularly, to a method and apparatus for automating replication in a clustered environment.

2. Description of the Related Art

Application clustering, sometimes called software clustering, is a method for turning multiple computer servers into a cluster that acts like a single system. In a cluster, a group of interconnected servers coordinate to enhance application and data availability, scalability, and manageability. Clusters can potentially solve significant computing problems such as failure, network or I/O path failure, application growth and management cost containment. Additionally, clusters can help eliminate both planned and unplanned downtime and manage a wide range of applications in a heterogeneous environment.

Traditionally, clustering software is installed on each of the servers and/or nodes of the cluster group and each server maintains the same information. Collectively, they perform administrative tasks such as load balancing, determining node failures, and assigning failover duty. Application failover is a feature of clustering. Applications can be configured to run on multiple servers in the cluster group. Or, more precisely, each of the individual machines is configured to support the clustered application. When a clustered application fails on one node, or when a path error occurs on the path to a node, another instance of the application can be started on another node in the cluster, thereby helping to ensure that the application is continuously available. Moving an application from one server to another is also called migrating the application. Applications may be migrated as needed due to hardware/software failure, resource requirements, or administrative policy. Clustering also allows multiple instances of a clustered application to be executing in different cluster nodes in parallel, thus providing better overall system response to client requests.

SUMMARY

Replication of application files in a clustered environment may be automated based on the state and/or configuration of the application. A clustering engine may execute on one or more nodes in the clustered environment and may, possibly through a clustering API, notify one or more replication agents regarding changes in a clustered application's state and/or configuration.

A replication agent may receive status information regarding a clustered application from a clustering engine or other software configured to monitor and report changes in a clustered application's status. An application's status may include information indicating one or more cluster nodes on which the application is currently executing and also may include information indicating one or more cluster nodes on which the application is configured to execute. After receiving status information from a clustering engine, replication agents executing on cluster nodes may, either individually or through collective coordination, modify a replication policy for replicating one or more application files associated with the clustered application based on the received status information. Subsequently, the replication agents may replicate the application files from one of the clustered computing nodes to one or more other nodes, according to the modified replication policy.

In some embodiments, a replication agent may register with a clustering engine, or other cluster management software, to receive notifications regarding the status of the clustered application. Such a registration may be performed using a clustering API and the status notifications may also be performed via the same clustering API, perhaps through a callback function to the replication agent. After registering with the clustering engine to receive status information regarding a clustered application, a replication agent may receive an initial snapshot of the application's state. In response to this initial snapshot, a replication agent may replicate the application files to other cluster nodes on which the application is configured to execute. Additionally, the replication agent may be configured to monitor the application files and replicate any changes to those files to the other cluster nodes. In some embodiments, a replication agent may replicate changes in the application files immediately to other cluster nodes. In other embodiments, however, application file changes may only be replicated periodically according to a replication policy. In some embodiments, a replication agent may receive information indicating a replication frequency as part of status information received from a clustering engine and may monitor and/or replication application files according the received replication frequency.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
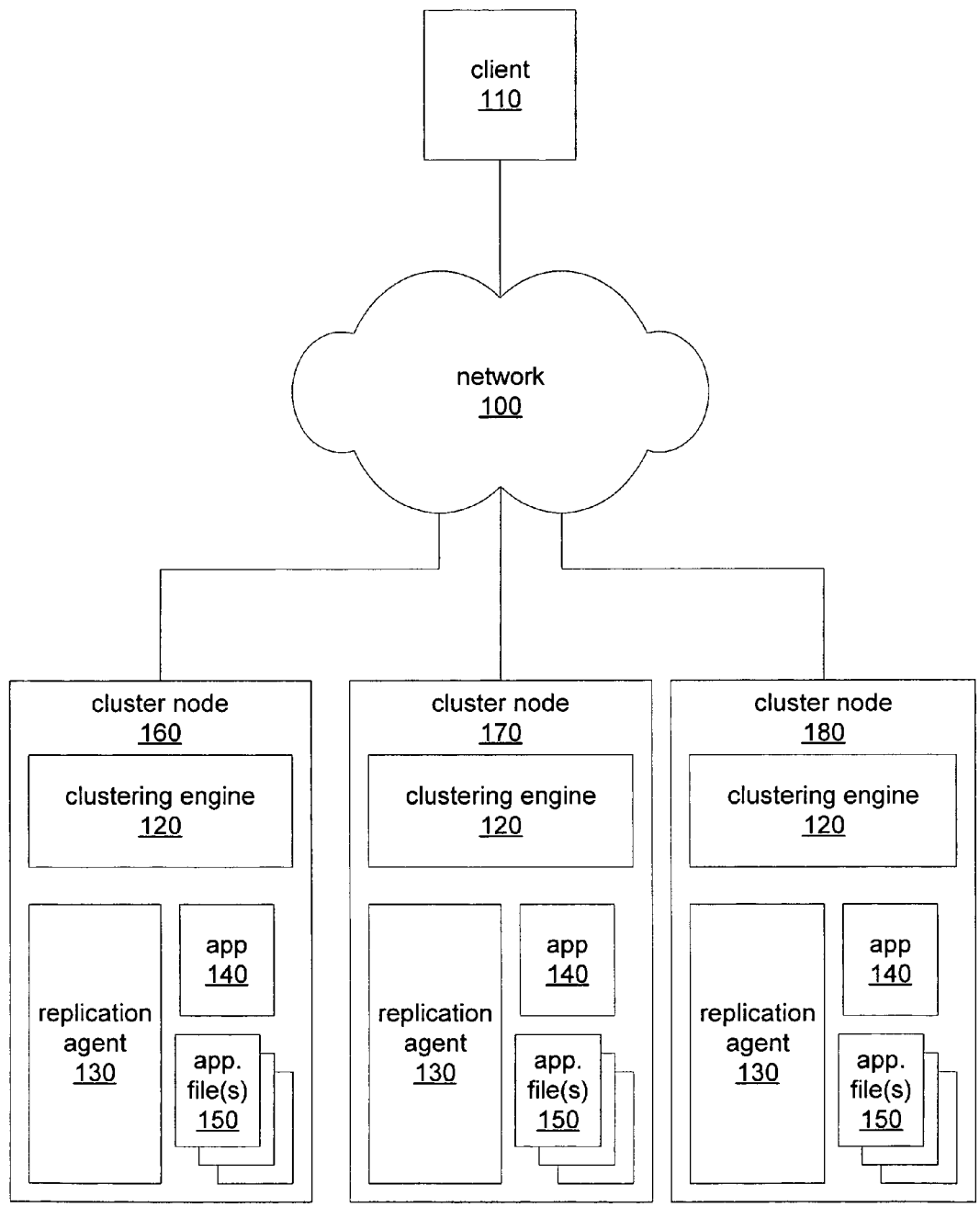
FIG. 1 is a block diagram illustrating a clustered environment including cluster nodes on which automated replication may be implemented, in one embodiment.

FIG. 1 illustrates a computer network, according to certain embodiments, which includes a cluster of computer nodes on which automated replication may be implemented. Replication agent software, such as replication agent 130, may be configured to replicate application files across multiple cluster nodes on which an application is configured to execute. In one embodiment, a clustered application, such as application 140 may be configured to execute on cluster nodes 160, 170, and 180. Cluster management software, such as clustering engine 120 may execute on one or more of the cluster nodes in order to manage the availability, and may monitor the status, of the application 140 on the cluster nodes. A clustering engine, such as clustering engine 120 may manage the availability of one or more clustered applications across clustered computing nodes. The clustering engine may be configured to automatically detect application, database or server failure and may be configured to automatically move the failed services to another node within the cluster. Replication agent 130 may, in some embodiments, automate the replication of files associated with a clustered application, database, or other service, and may use clustering APIs to communicate with a clustering engine and/or to synchronously or asynchronously receive status information from a clustering engine. In some embodiments, the clustering engine may handle other cluster management tasks such as cluster membership, load balancing, etc.

According to some embodiments, a replication agent may automate the replication of one or more application files associated with a clustered application across multiple cluster nodes. For instance, in one embodiment, replication agent 130 may be configured to replicate application file(s) 150 associated with application 140 from cluster node 160 to cluster node 170 and/or 180. Application file(s) 150 may represent various types of files associated with application 140, such as data files, log files, and/or configuration files. Replication agent 130 may be configured, in some embodiments, to replicate application file(s) 150 based on status information regarding application 140 received from clustering engine 120. For instance, clustering engine 120 may be configurable to monitor and report status information regarding application 140 to replication agent 130. In some embodiments, clustering engine 120 may be dynamically configured at run-time through a clustering API, to deliver changes in the status information for a clustered application. In one embodiment, such status information may include state information indicating one or more cluster nodes on which application 140 is currently active. In some embodiments, the status information regarding an application may include information regarding any allowed application state. Replication agent 130 may receive status information from clustering engine 120 and may modify a replication policy regarding application 140 based on the received status information. For instance, replication agent 130 may receive status information from clustering engine 120 indicating that application 140 is active on cluster node 160 and replication agent 130 may modify a replication policy regarding application 140 to indicate that cluster node 160 is a source node from which to replicate files associated with application 140. While, in certain embodiments, replication agent 130 may be modifying a global replication policy that covers more than just application 140, in general replication agent 130 may modify a local replication policy regarding only application 140 and the current clustering environment.

In some embodiments, an instance of the clustering engine executes on every node in the cluster. In other embodiments, however, the clustering engine only resides on a single cluster node, while proxy engines execute on other nodes in the cluster. Similarly, in some embodiments, a replication agent executes on each cluster node. In other embodiments, however, a single replication agent executing on a single cluster node may perform automated replication of application files to and from other cluster nodes, even to and from nodes on which no replication agent is executing. In yet other embodiments, a replication agent always resides on the node on which the application is currently executing.

A replication agent may receive status information regarding a clustered application from a clustering engine or other software configured to monitor and report changes in a clustered application's status. An application's status may include information indicating one or more cluster nodes on which the application is currently executing and also may include information indicating one or more cluster nodes on which the application is configured to execute but on which it is not currently executing. After receiving status information from a clustering engine, replication agents executing on cluster nodes may, either individually or through collective coordination, modify a replication policy for replicating one or more application files associated with the clustered application based on the received status information. For example, a replication agent may modify a replication policy to indicate a cluster node as a source node for replication and may also modify the replication policy to indicate target nodes for replication. Subsequently, the replication agents may replicate the application files from one of the clustered computing nodes to one or more other nodes, according to the modified replication policy. For instance, in some embodiments, if a clustered application fails and a clustering engine performs a failover and migrates the application to a different cluster node, the clustering engine may send status information regarding the failover to a replication agent. In other embodiments, the clustering engine may also include information identifying the cluster node on which the application failed. The replication agent may then modify a replication policy for the application to indicate the new active node on which the application is executing, according to one embodiment. For example, the replication agents may modify the replication policy to indicate that the application files on the new cluster node should be the source files for replication rather that the previous node on which the application failed.

In some embodiments, a replication agent may register with a clustering engine to receive status information. Such a registration may be performed using a clustering API and the status notifications may also be performed via a clustering API, perhaps through a callback function to the replication agent, according to different embodiments. In one embodiment, replication agent 130 may register via a clustering API to asynchronous receive status information for one or more clustered applications and clustering engine 120 may monitor the status of those clustered applications and notify replication agent 130 regarding any change in the status for those applications. In another embodiment, rather than register for asynchronous status updates, replication agent 130 may periodically query clustering engine 120 for status information regarding one or more clustered applications. For example, replication agent 130 may register with clustering engine 120 to receive status information regarding application 140. In some embodiments, replication agent 130 may register to receive status information specifically regarding application 140. In other embodiments, however, replication agent 130 may register to receive status information for all clustered applications. In some embodiments, replication agent 130 may be configured to use a cluster API to register with clustering engine 120. In other embodiments, replication agent 120 may register with clustering engine 120 in other ways. Clustering engine 120 may be configured to notify replication agent 130 with status information, including state changes and configuration changes regarding application 140. In one embodiment, clustering engine 120 may be configured to notify replication agent 130 through a callback function established via a clustering API.

After registering with the clustering engine to receive status information regarding a clustered application, a replication agent may receive an initial snapshot of the application's state. In response to this initial snapshot, a replication agent running on the same node as the application is executing (either initially, or after a failover) may replicate the application files to other cluster nodes on which the application is configured to execute. This initial replication may ensure that all the cluster nodes on which the application is configured to execute include uniform versions of the application files.

When a clustered application's state changes, a clustering engine may notify one or more replication agents accordingly. For example if application 140 fails on one cluster node and is failed over, or migrated, to another cluster node, clustering engine 120 may, in one embodiment, notify replication agent 130. In some embodiments, clustering engine 120 may include information identifying the new node, such as cluster node 160, on which application 140 is executing. Replication agent 130 may, in response to such a notification, modify a replication policy for application 140 to identify cluster node 160 as an active, or source node, from which to replicate application file(s) 150. In other embodiments, clustering engine 120 may include information identifying the node that is no longer configured to execute the application. For example, when an application is failed over from one cluster node to another, clustering engine 120 may notify replication agents regarding both nodes.

Additionally, the replication agent on the source cluster node may be configured to monitor the application files and replicate any changes to those files to the other cluster nodes. In some embodiments, a replication agent may replicate changes in the application files immediately to other cluster nodes. In other embodiments, however, application file changes may only be replicated periodically according to a replication policy. In some embodiments, a replication agent may receive information indicating a replication frequency as part of status information received from a clustering engine and may monitor and/or replication application files according the received replication frequency. In one embodiment, a replication agent may modify a replication policy based on a received replication frequency.

In another example, clustering engine 120 may send status information to replication agent 130 indicating that application 140 may be configured to execute on cluster node 180. Application 140 may not be executing on cluster node 180, but both application 140 and cluster node 180 may be configured so that application 140 may execute on cluster node 180. For instance, application 140 may be configured to migrate or fail over to cluster node 180. Thus, in such an example, cluster node 180 may be a target node to which to replicate application files associated with application 140. In response to receiving status information indicating that application 140 may be configured to execute on cluster node 180, replication agent 130 may modify the replication policy for application 140 to indicate cluster node 180 as a target node to which application file(s) 150 may be replicated.

In one embodiment, replication agent 130 may be configured to execute on every node in the clustered environment. The various instances of replication agent 130 may be configured to coordinate to determine and maintain a single replication policy for application files to be replicated, according to certain embodiments. In other embodiments, however, each instance of replication agent 130 may be configured to maintain its own replication policy based on application status information received from clustering engine 120. In certain embodiments, application files are replicated by a replication agent residing on the same cluster node as the source version of the application files. For instance, if cluster node 160 is an active node for application 140, in other words, if application 140 is actively executing on cluster node 160, replication agent 130 on cluster node 160 may replicate application files from cluster node 160 to other cluster nodes. Similarly, if cluster node 170 is an active node for application 140, replication agent 130 on cluster node 170 may perform the replication of the application files. In other embodiments, however, a replication agent not residing on the active cluster node may replicate application files. For example, if cluster node 180 is an active node for application 140, replication agent 130 on cluster node 160 may replicate application files from cluster node 180 to cluster nodes 160 and 170. Thus, which replication agent replicates application files may vary from embodiment to embodiment.

In certain embodiments, an application may be configured to execute on more than one cluster node at the same time. For example, in order to support a load balancing policy, there may be two or more active nodes on which a clustered application is currently executing. In such embodiments, a replication agent on each of the active nodes may monitor and replicate changes to application files from each of the active nodes to the other nodes on which the application is configured to execute. In one embodiment, a single replication agent executing on one of the active nodes may be configured to monitor and replicate application files from all of the application's active nodes. In other embodiments, replication agents on each active node may be configured to coordinate together when replicating files for the application.

In one embodiment, the instance of clustering engine 120 executing on a active node for a clustered application (a node on which the application is currently executing) may notify the instance of replication agent 130 also executing one the same cluster node about changes to the status information for the clustered application. In other embodiments, however, clustering engine 120 may send status information to all the instances of replication agent 130, no matter the cluster node on which they are executing. In some embodiments, only the replication agent on the active cluster node may be notified regarding relevant status changes for an application. For example, in one embodiment, application 140 may begin executing on cluster node 160 and clustering engine 120 on cluster node 160 may notify the instance of replication agent 130 on cluster node 160 that application 140 is now executing on cluster node 160. Alternatively, in another embodiment, clustering engine 120 may notify every instance of replication agent 130 that cluster node 160 is currently the active node for application 140. In another example, clustering engine 120 on cluster node 160 may notify only replication agent 130 on cluster node 160 that application 140 may be configured to execute on cluster nodes 170 and 180. Thus, replication agent 130 on cluster node 160 may then replicate application file(s) 150 from cluster node 160 to cluster nodes 170 and 180. Thus, in some embodiments, a single replication agent may be notified regarding specific status information for an application and that replication agent may be able to automate replication across all the cluster nodes on which the application in configured to execute. In other embodiments, an instance of clustering engine 120 may send status information to other instances of clustering engine 120, or proxy engines, executing on other cluster nodes and each instance of cluster engine 120, or each proxy engine, may send the status information to a replication agent executing on its respective cluster node.

Network 100, as illustrated in FIG. 1, may comprise any of various network technologies according to various embodiments. Network 100 may be a local area network, wide area network, intranet network, Internet network, or many other types of network. Network 100 may be designed to be continuously available (although network outages may occur), or may be intermittent (e.g. a modem connection made between a computer system in a user's home and a computer system in a user's workplace). Network 100 may utilize any of a number of different physical networking technologies including, but not limited to, Fiber Channel, Ethernet, Fast-Ethernet, Gigabit-Ethernet, Myrinet, Infiniband, VAX CI, or ServerNet, or others. Network 100 may be configured according to a number of different network topologies including, but not limited to, star, token-ring, token-bus, scatternet, dual-ring, mesh, etc. Network 100 may also be configured to utilize a combination of different networking technologies and/or topologies. Additionally, Network 100 may comprise shared storage or shared memory for communicating between different computer systems or between processes within the same computer system, according to some embodiments.

Figure 2:
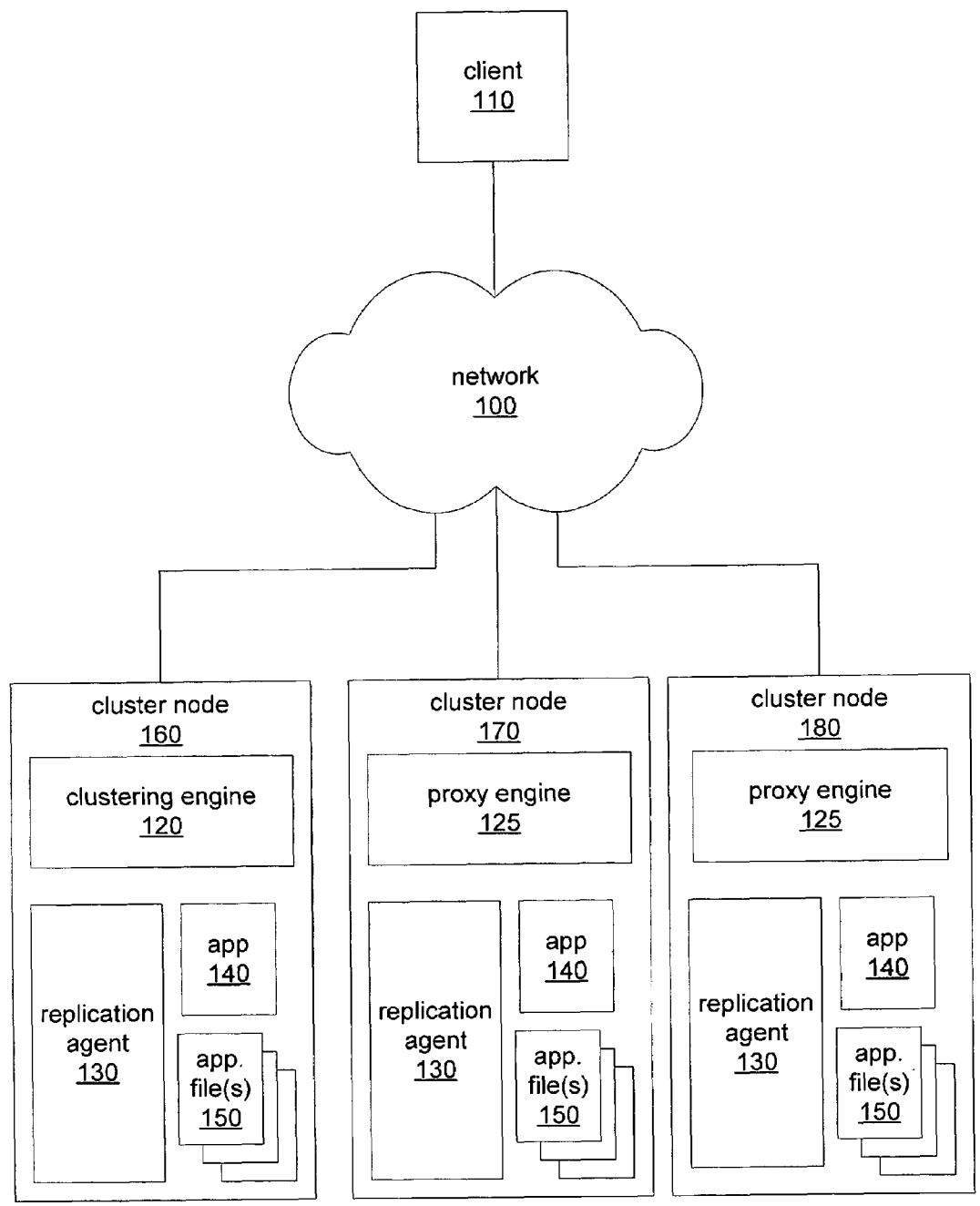
FIG. 2 is a block diagram that illustrates, according to one embodiment, a clustered environment implementing automated replication using clustering engine proxies.

FIG. 2 is a block diagram illustrating, according to one embodiment, a clustered environment implementing automated replication using clustering engine proxies. In some embodiments, a clustered environment may include multiple cluster nodes, such as cluster nodes 160, 170, and 180, but may not have an instance of a clustering engine executing on every one of those cluster nodes. For instance, clustering engine 120 may be executing only on cluster node 160. In some embodiments, a proxy engine, such as proxy engine 125 may be resident on other cluster nodes in the clustered environment. In one embodiment, a proxy engine may communicate with a clustering engine executing on a different cluster node to allow the clustering engine to perform and manage clustering activities on the cluster node on which the proxy engine is executing. For instance, proxy engine 125 on cluster node 170 may communicate with clustering engine 120 on cluster node 160 allowing clustering engine 120 to monitor and report on the status of application 140 on cluster node 170.

In some embodiments, a clustering engine on one cluster node may be able to coordinate the availability and configuration of clustered applications using a proxy engine on another cluster node. For example, in one embodiment, clustering engine 120 on cluster node 160 may be configured to communicate with proxy engine 125 on cluster node 170 in order to configure, execute, and/or monitor the state of application 140, among other things. In another embodiment, proxy engine 125 may be configured to act as a client to clustering engine 120, while in other embodiments, proxy engine 125 may be configured to act as a service through which clustering engine 120 accesses information on cluster node 170. For example, in one embodiment, clustering engine 120 may be configured to periodically query proxy engine 125 regarding the state and/or configuration of application 140 on cluster node 170. In another embodiment, cluster engine 120 may instruct proxy engine to monitor the state and/or configuration of application 140 on cluster node 170 and to notify clustering engine 120 regarding any changes in the status of application 140. In yet another embodiment, proxy engine 125 may be configured to be a passive extension of clustering engine 120 allowing clustering engine 120 to access files and other data on cluster node 170.

In one embodiment, proxy engine 125 may be configured to communicate with an instance of replication agent 130 on cluster node 170 on behalf of clustering engine 120. Thus, when clustering engine 120 needs to notify an instance of replication agent 130 on cluster node 170 regarding the status of application 140, clustering engine 120 may communicate with proxy engine 125 and in turn, proxy engine 125 may communicate with the instance of replication agent 130 on cluster node 170, according to one embodiment. Similarly, proxy engine 125 may act as a proxy for replication agent registration as well. For instance, in one embodiment, replication agent 130 on cluster node 170 may register to receive status information regarding application 140 by communicating with proxy engine 125 and in turn, proxy engine 125 may forward the registration request to clustering engine 120 on cluster node 160. In some embodiments, a replication agent may not know whether it is communicating with a clustering engine or a proxy engine.

Figure 3:
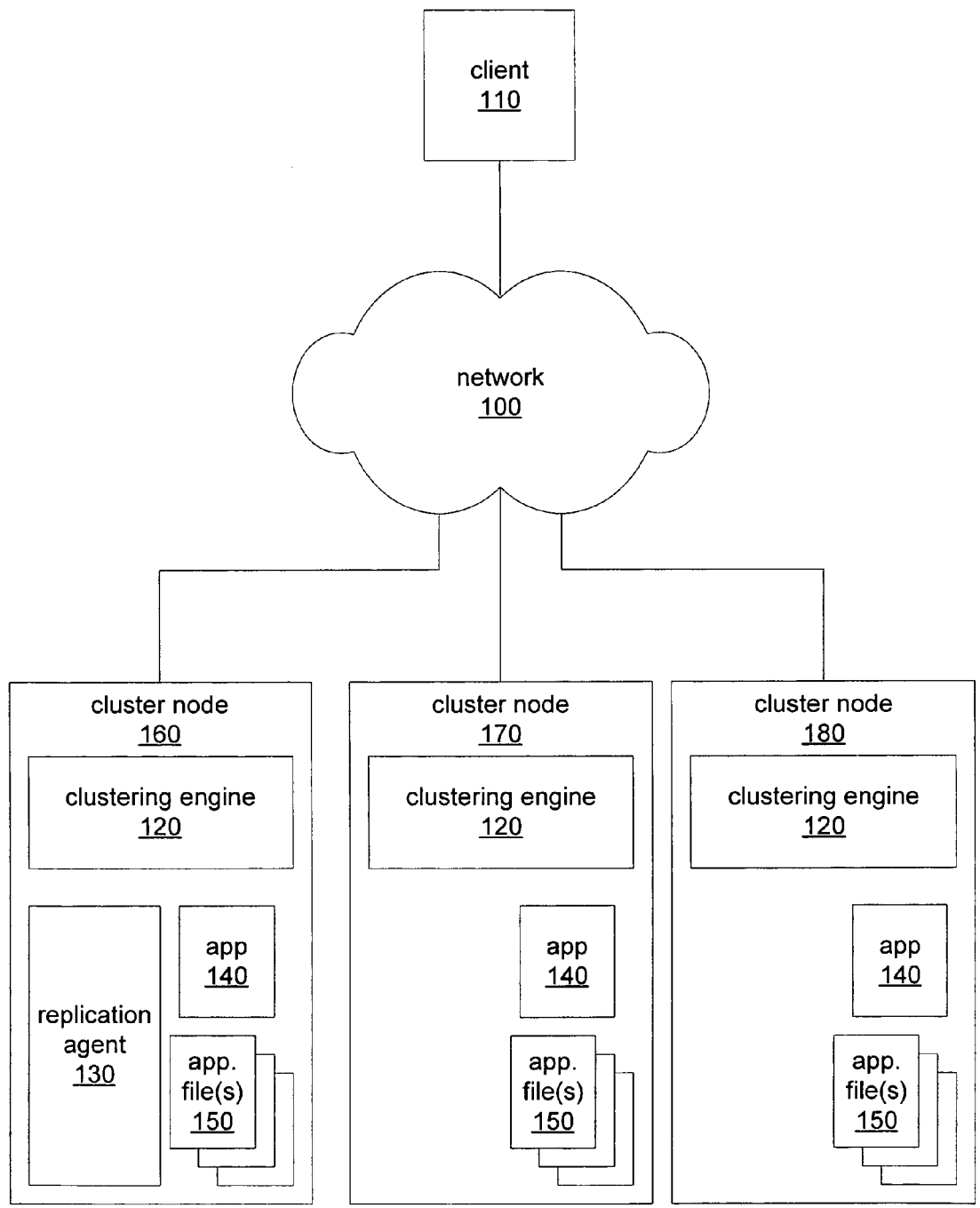
FIG. 3 is a block diagram illustrating, according to one embodiment, a cluster environment using a single replication agent to implement automated replication.

FIG. 3 is a block diagram illustrating, according to one embodiment, a clustered environment using a single replication agent to monitor and replicate application files in a clustered environment. While in the preceding discussions an instance of a replication agent was resident on every cluster node on which a clustered application was configured to execute, in some embodiments, a single replication agent may be configured to perform all the replication for an application while being resident only a single cluster node. For example, in one embodiment, replication agent 130 may be configured to replicate application file(s) 150 from cluster node 160 to cluster nodes 170 and 180 while only executing on cluster node 160. In such an example, a replication agent may have the ability to read and write files on any cluster node in the clustered environment. For example, replication agent 130 may be configured to monitor application file(s) 150 on either or both cluster nodes 170 and 180 as well as on cluster node 160. In one embodiment, replication agent 130 may be configured to only monitor files on a cluster node that is currently hosting an active instance of application 140. In other embodiments, however, replication agent 130 may be configured to monitor application file(s) 150 on every cluster node regardless of whether that node is currently the node on which application 140 is active.

In some embodiments, replication agent 130 executing on cluster node 160 may be configured to replicate application file(s) 150 from any one cluster node to other cluster nodes, regardless of on which cluster node replication agent 130 is currently executing. For instance, replication agent 130 on cluster node 160 may be notified that application 140 is active on cluster node 170 and may replication application file(s) 150 from cluster node 170 to both cluster node 160 and cluster node 180.

Figure 4:
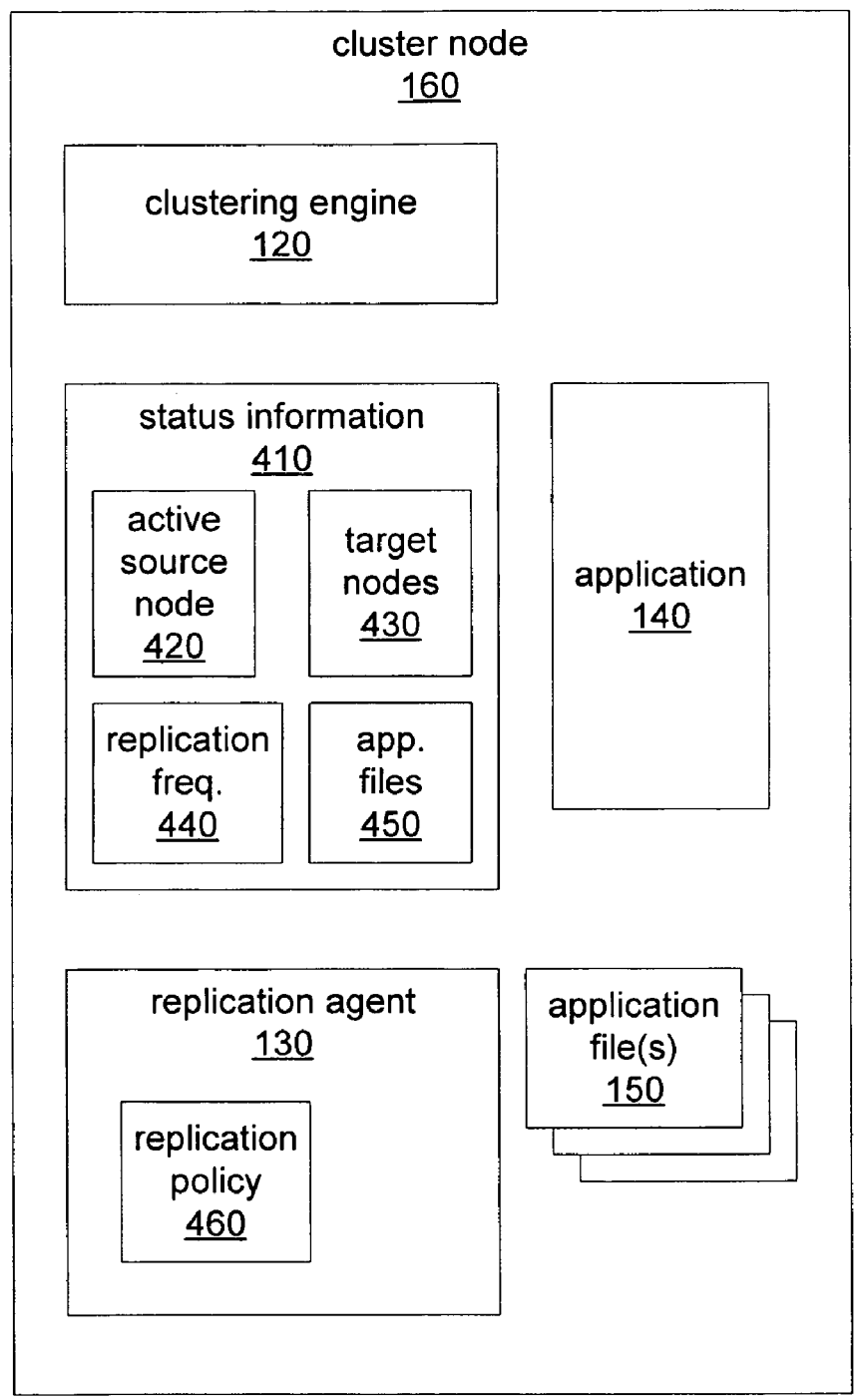
FIG. 4 is a block diagram that illustrates one embodiment of a cluster node including status information for a clustered application.

FIG. 4 is a block diagram that illustrates one embodiment of status information sent by a clustering engine to a replication agent on a cluster node. A cluster node may include a clustering engine 120, a replication agent 130 and one or more clustered applications, such as application 140. In some embodiments, replication agent 130 may receive status information from clustering engine 120 regarding application 140. When providing status information, such as status information 410, clustering engine may include various pieces of information in status information 410. For example, in one embodiment, clustering engine 120 may provide an indication of the cluster node on which application 140 is currently active, such as active source node 420.

Additionally, in some embodiments, clustering engine 120 may be configured to supply an indication of one or more cluster nodes on which application 140 is configured to execute, such as target nodes 430. Clustering engine may indicate active source nodes and target nodes in any of numerous manners, according to various embodiments. In one embodiment, clustering engine 120 may include the name of a cluster node in status information 410, while, in another embodiment, clustering engine 120 may include a numeric ID that identifies a cluster node. In yet another embodiment, clustering engine may be configured to supply both a name and an ID in status information 410. In general, clustering engine 120 may indicate cluster nodes by any of many suitable manners, and the manner in which clustering engine 120 may indicate cluster nodes may vary from embodiment to embodiment.

Clustering engine 120 may also include an indication of one or more application files or portions of application files associated with application 140 to be replicated across cluster nodes, according to certain embodiments. In one embodiment, clustering engine may include the names of one or more files, as illustrated by application file(s) 150 in status information 410. In other embodiments, however, a configuration file accessible by the replication agents may indicate the application files or portions of the applications files to be replicated. For example, in one embodiment, each replication agent may access a cluster-wide configuration file to determine which application files to monitor and/or replicate. In certain embodiments, a single replication agent may determine the application files to monitor and/or replicate by accessing such a configuration file and may then inform other replication agents which application files to monitor and/or replicate. In some embodiments, clustering engine 120 may include an indication of a replication frequency regarding application 140 in status information 410. In other embodiments, the replication frequency may be stored in a cluster-wide configuration file. In general, the manner in which the application files and replication frequency are configured and in which replication agents learn about such configuration information may vary from embodiment to embodiment.

While FIG. 4 and the above discussion only refer to clustering engine 120 including information regarding application 140 in status information 410, in some embodiments clustering engine 120 may be configured to include status information for a number of different applications when supplying status information to replication agent 130. Additionally, the exact information included in status information sent by a clustering engine to a replication agent may vary from embodiment to embodiment and from notification to notification within a single embodiment. In other words, clustering engine 120 may only include an active source node 420 in information 410 if application 140 is executing on a new cluster node, and may not include active source node 420 in status information 410 every time it sends status information to replication agent 130. In general status information 410 may include one or more different types of status information, such as active source node 420, target nodes, 430, replication frequency 440, and/or application files 450, according to various embodiments. While FIG. 4 and the above description refer to certain specific examples of status information, in other embodiments, status information 410 may include information for any attributes of the clustered objects such as application, its resources, cluster nodes, etc.

Figure 5:
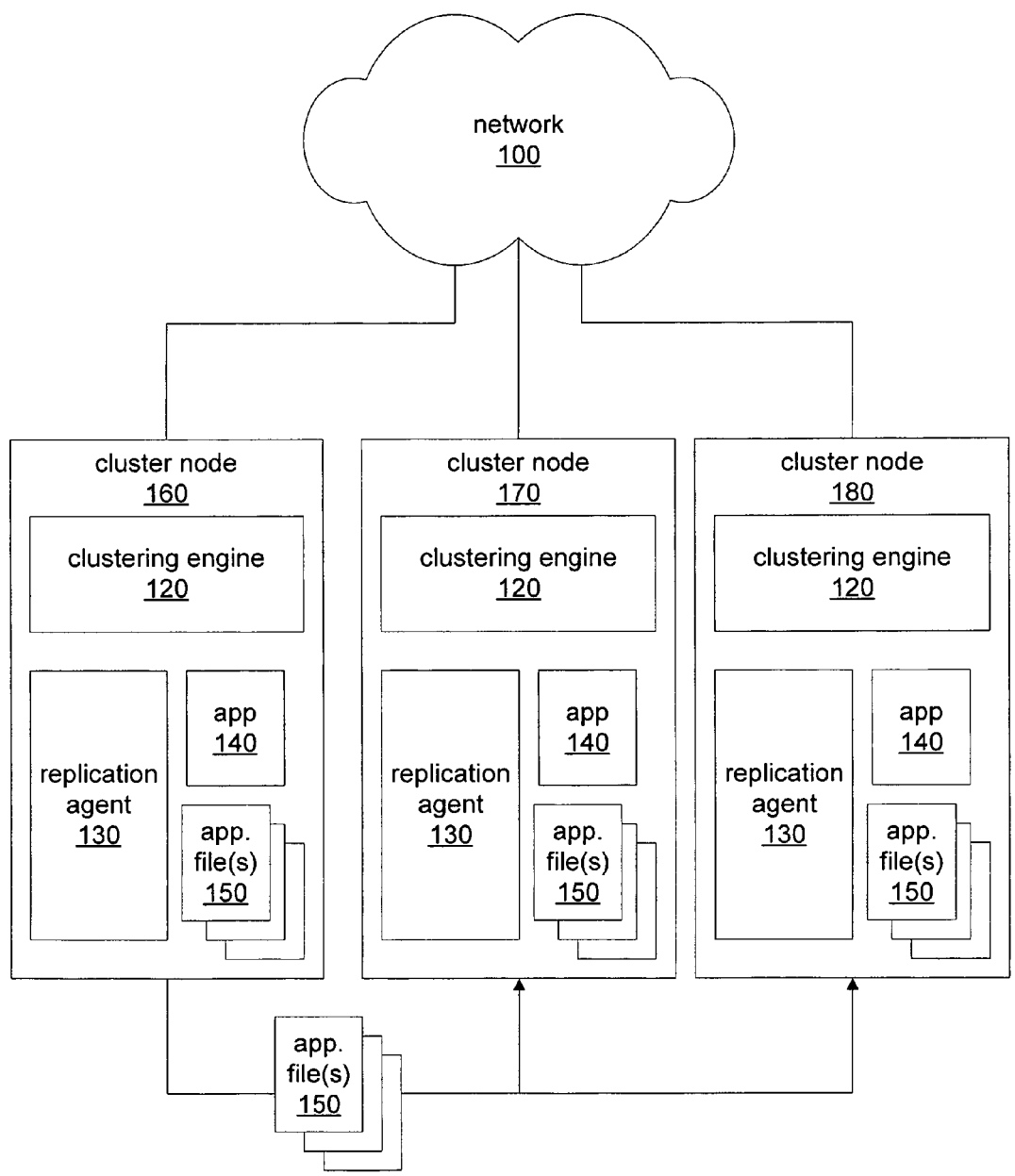
FIG. 5 is a block diagram illustrating automated replication of application files from one cluster node to other cluster nodes, according to one embodiment.

FIG. 5 is a block diagram illustrating automated replication of application files from one cluster node to one or more other cluster nodes, according to one embodiment. As described above, a replication agent may monitor application files and may replicate changes to those files across multiple cluster nodes. For instance, replication agent 130 may have registered with clustering engine 120 and may have received status information from clustering engine 120 indicating that application 140 is active on cluster node 160 and that application 140 is also configured to execute on cluster nodes 170 and 180, according to one embodiment. Additionally, replication agent 130 may have received status information identifying application file(s) 150 as files associated with application 140 and that should be replicated.

Subsequently, replication agent 130 may monitor application file(s) 150 for changes and may replicate any detected changes from cluster node 160, the currently active node for application 140, to cluster nodes 170 and 180, as illustrated in FIG. 5, according to one embodiment. When replicating application file(s) 150, the instance of replication agent 130 on cluster node 160, the active node, may coordinate with instances of replication agent 130 on cluster nodes 170 and 180, in some embodiments. For instance, replication agent 130 on cluster node 160 may communicate information to replication agent 130 on cluster node 170 including the files or portions of files to be replicated and replication agent 130 on cluster node 170 may save or update the application files on cluster node 170 to be in synchronization with the application files on cluster node 160.

In other embodiments, however, each instance of replication agent 130 may be responsible for replicating files from its cluster node to the other cluster nodes without coordinating with other replication agents on the other cluster nodes. For example, if cluster node 160 is the active node for application 140, an instance of replication agent 130 on cluster node 160 may be responsible for monitoring and replicating changes to application file(s) 150 from cluster node 160 to cluster nodes 170 and 180. Similarly, in such an example, if cluster node 170 is the active node for application 140, the instance of replication agent 130 on cluster node 170 may be responsible for monitoring and replicating changes to application file(s) 150 on cluster node 170 to cluster nodes 160 and 180. When replicating files from cluster node 160, replication agent 130 may use any of a number of data transfer technologies to replicate files, or portions of files, from one cluster node to another cluster node.

Figure 6:
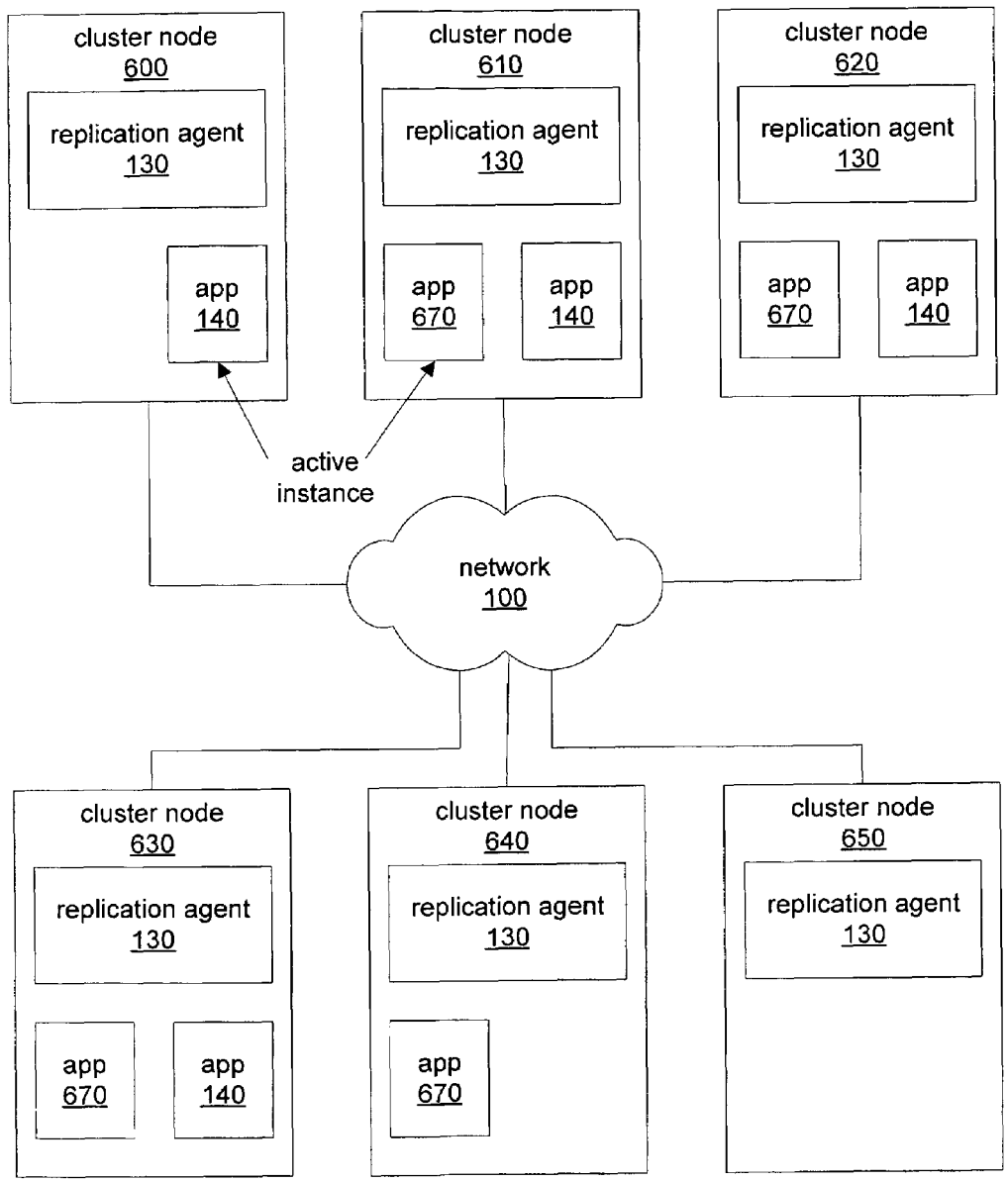
FIG. 6 is a block diagram illustrating automated replication of application files for multiple clustered applications.

FIG. 6 is a block diagram illustrating the automated replication of application files for multiple clustered applications. In some embodiments, replication agents may be configured to replicate files for multiple clustered applications. For example, application 140, as illustrated in FIG. 6, may be configured to execute on cluster nodes 600, 610, 620 and 630, according to one embodiment. Application 670 may be configured to execute on cluster node 610, 620, 630 and 640. Cluster node 600 may be the active node for application 140 and cluster node 610 may be the active node for application 670, according to one embodiment. In some embodiments, a replication agent may be configured to monitor and/or replicate files for multiple clustered applications on a single node. For example, replication agent 130, executing on cluster node 610 may be configured to monitor and/or replicate application file(s) 150 for application 140 and application 670. In one embodiment, a single cluster node may be the active node for more than one application (not illustrated). In other embodiments, however, one cluster node, such as cluster 610, may be the active node for one application while other application may also be configured to execute on that node.

Additionally, clustering engine 120 (not illustrated in FIG. 6) may also be configured to monitor and report status information for multiple clustered applications, according to some embodiments. In general, clustering engines and replication agents may be configured to automate the replication of application files for multiple applications configured to execute on multiple nodes of the clustered environment.

When monitoring and replicating files for multiple applications, a replication agent may, in one embodiment, be configured to replicate files only to those nodes on which the relevant application is configured to execute. For example, replication agent 130 on cluster node 600 may replicate changes to files for application 140 only to those nodes on which application 140 is configured to execute. Specifically, in such an example, replication agent 140 may replicate files for application 140 from cluster node 600, the active node for application 140, to cluster nodes 610, 620, and 630, but not to cluster nodes 640 and 650. As described above, in some embodiments, replication agent 130 may receive status information from a clustering engine (not illustrated in FIG. 6) that may identify those nodes on which application 140 is configured to execute. Alternatively, in other embodiments, replication agent 130 may be configured to access a configuration file to determine the specific nodes on which a clustered application is configured to execute. Similarly, replication agent 130 on cluster node 610 may replicate files for application 670 from cluster 610, an active node for application 610, to cluster nodes 620, 630, and 640, but not to cluster nodes 600 and 650.

In other embodiments, a replication agent may communicate with all other replication agents in the clustered environment when replicating files and each replication agent may be responsible for determining whether the replicated files are associated with an application that is configured to execute on its respective cluster node. For instance, replication agent 130 on cluster node 600 may send replication information, such as changes to application files for application 140, to every other cluster node regardless of whether application 140 is configured to execute on each other cluster node. In such an example, when a replication agent receives replication data for a clustered application, that replication agent may determine whether the relevant application is configured to execute on its respective cluster node and thus whether or not to apply the replication data to files on that cluster node. Similarly, replication agent 130 on cluster node 610 may send replication data for files associated with application 670 to every cluster node and rely upon the receiving replication agent to determine whether nor not application 670 is configured to execute on its particular cluster node. Thus, in some embodiments, a replication agent may receive, and ignore, replication data for an application that is not configured to execute on that particular node. In other words, in some embodiments, a replication agent may broadcast replication changes to all cluster nodes and rely upon the receiving replication agent to determine whether or not those changes apply to that particular cluster node.

Figure 7:
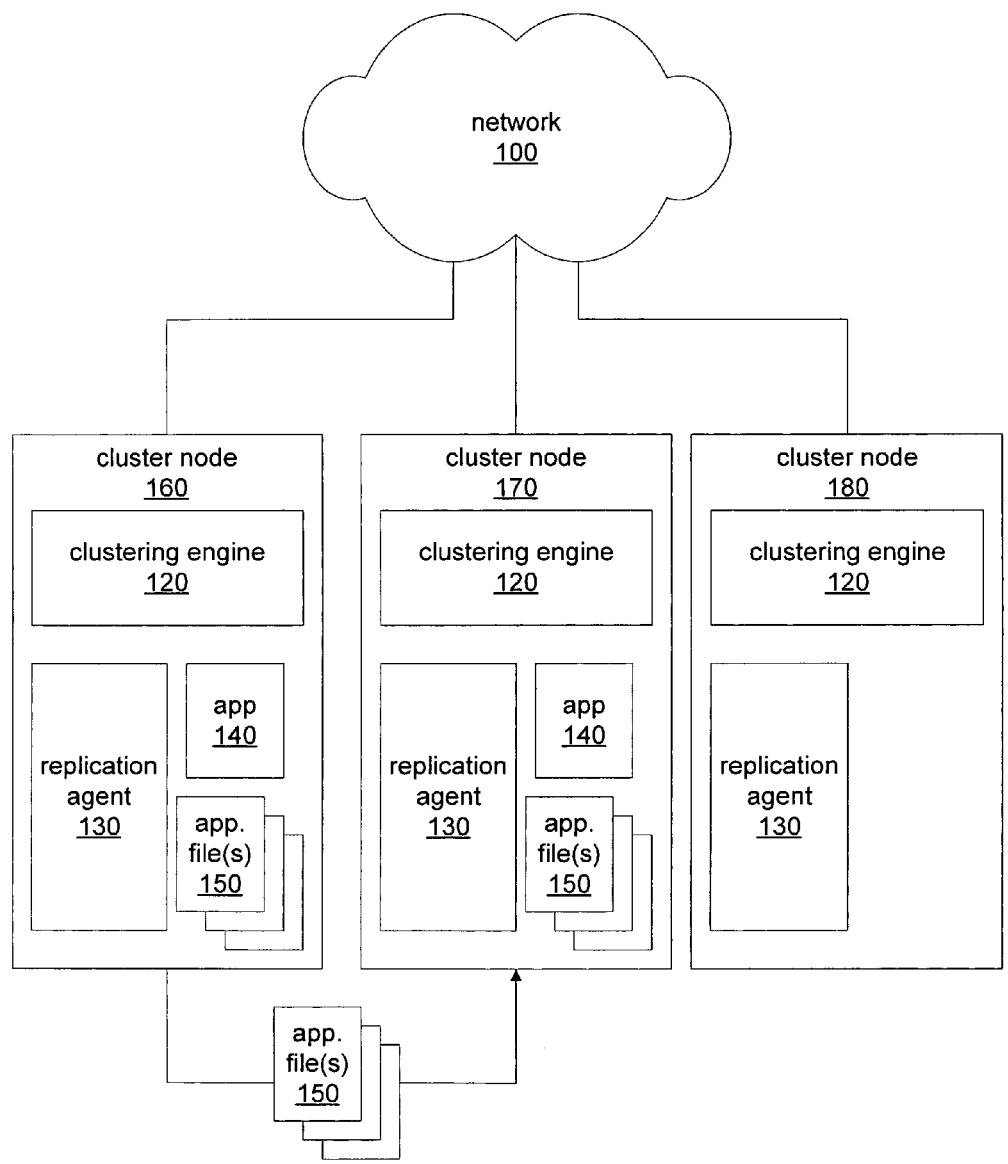
FIG. 7 is a block diagram illustrating automated replication of application files from one cluster node to some, but not all other cluster nodes of the clustered environment, in one embodiment.

FIG. 7 is a block diagram illustrating automated replication of application files from one cluster node to some, but not all other cluster nodes of the clustered environment, in one embodiment. According to some embodiments, a clustered environment may be configured, possibly by a clustering engine such that a clustered application is configured to execute on some but not all of the cluster nodes in the clustered environment. In such an embodiment, a replication agent may be configured to replicate application files from one cluster node to one or more cluster nodes on which the application is configured to execute, while not replicating the files to one or more cluster nodes on which the application is not configured to execute. For example, a clustered environment, such as depicted in FIG. 6, according to one embodiment, may be configured such as application 140 is configured to execute on cluster node 160 and cluster node 170, but not on cluster node 180. Clustering engine 120 may initiate execution of application 140 on cluster node 160, and may notify replication agent 130 that application 140 is active on cluster node 160. In response, replication agent 130 may monitor application file(s) 150 on cluster node 160 for changes. If or when replication agent 130 detects changes in application file(s) 150, replication agent 130 may replicate those changes from cluster node 160 to cluster node 170, but not to cluster node 180. In one embodiment, a cluster node on which application 140 is not configured to execute may still have an instance of replication 130 running on it. Clustering engine 120 may be configured to dynamically add or remove cluster nodes from the list of cluster nodes on which application 140 may be configured to execute. In other embodiments, clustering engine 120 may be configured to execute replication agent 130 on cluster node 180 when configuring application 140 to execute on cluster node 180.

Figure 8:
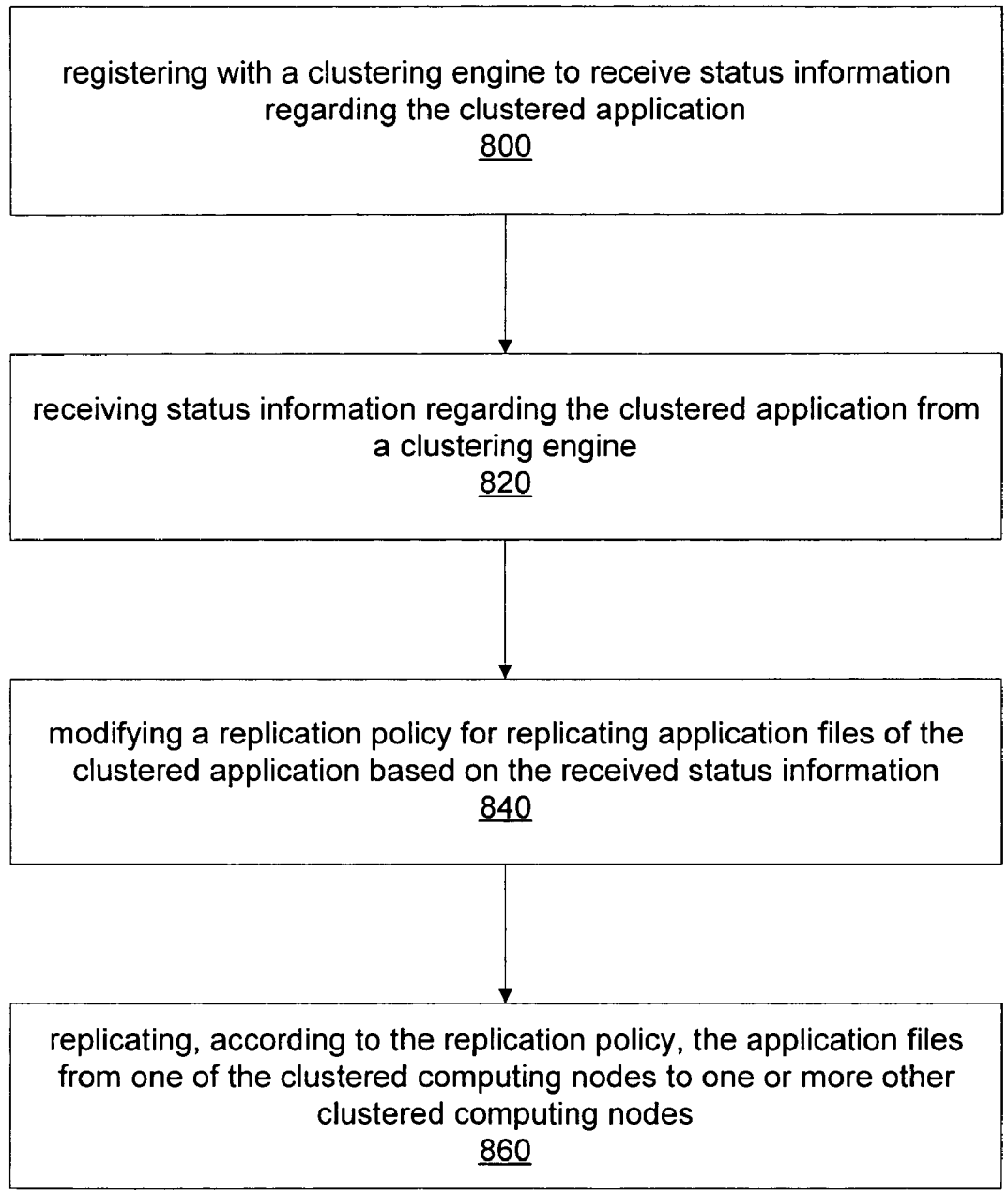
FIG. 8 a flowchart illustrating a method for automated replication, according to one embodiment.

FIG. 8 a flowchart illustrating a method for automated replication in a clustered environment, according to one embodiment. A replication agent may, according to certain embodiments, register with a clustering engine to receive status information regarding the clustered application, as illustrated by block 800 of FIG. 8. For example, replication agent 130 executing on cluster node 160 may register with clustering engine 120 also executing on cluster node 160 to receive status information regarding application 140, according to one embodiment. In other embodiments, replication agent 130 may register with a clustering engine executing on a different cluster node, such as cluster node 170, depending on the exact configuration of the clustered environment. In yet other embodiments, a replication agent may register with a proxy engine instead of clustering engine and the replication agent may not know whether it is registering with a clustering engine or a proxy engine. In one embodiment, replication agent 130 may reference application 140 when registering, and subsequently may only receive status information regarding application 140. In yet other embodiments, replication agent 130 may register to receive status information regarding any applications without specifying or referencing any particular application while registering.

A replication agent may register with a clustering engine through a clustering API or library. For example, in one embodiment, replication agent 130 may register via a cluster API. In other embodiments, replication agent 130 may register in another manner that doesn't use a specific clustering API. Clustering engine 120 may expose such a clustering API, in some embodiments.

Clustering engine 120 may, in some embodiments, monitor status information regarding application 140 and may notify replication agent, and possibly other registered replication agents, regarding changes in the status of application 140. Thus, in some embodiments, a replication agent may receive status information regarding the clustered application from the clustering engine, as illustrated by block 820. For instance, replication agent 130 may receive status information regarding application 140 from clustering engine 120, according to one embodiment. Replication agent 130 may receive status information including information indicating a cluster node, or nodes, on which application 140 is currently executing (active nodes), in one embodiment. For example, clustering engine 120 may manage the availability of application 140 and may initiate execution of application 140 on cluster node 160. In such an example, clustering engine 120 may notify replication agent 130 that application 140 is now active on cluster node 160. In other embodiments, replication agent 130 may receive status information including information indicating one or more cluster nodes on which application 140 is configured to execute. For example, clustering engine 120 may configure the clustered environment and application 140 so that application 140 may execute on cluster nodes 170 and 180. Clustering engine 120 may notify replication agent 130 regarding the fact that application 140 is configured to execute on cluster nodes 170 and 180. In other embodiments, clustering engine 120 may include in the status information a frequency for replicating changes to files for application 140 and may, in certain embodiments, include information indicating one or more files for application 140 that should be replicated.

Additionally, a replication agent may modify a replication policy for replicating files of the clustered application based on the received status information, as illustrated by block 840. For example, replication agent 130 may receive information that application 140 is currently active on cluster node 160 and replication agent 130 may modify replication policy 460 to indicate that cluster node 160 is a source node for replicating files of application 140. Replication agent 130 may maintain replication policy 460 regarding application 140 and may use that policy when replicating application files for application 140. In another embodiment, replication agent 130 may receive status information from clustering engine 120 that includes information indicating one or more cluster nodes on which application 140 is configured to execute and replication agent 130 may modify replication policy 460 to indicate those cluster nodes as target nodes to which files associated with application 140 should be replicated. Replication agent 130 may, in other embodiments, receive status information from clustering engine including a replication frequency and may modify replication policy 460 to indicate that replication frequency. Likewise, replication agent may receive status information indicating one or more files associated with application 140 and may modify the replication policy to indicate that those files should be replicated for application 140.

According to some embodiments, a replication agent may replicate, according to the replication policy, the application files from one of the clustered computing nodes to one or more other clustered computing nodes, as illustrated by block 860. For example, in one embodiment, replication agent 130 may replicate application file(s) 150 according to replication policy 460. For instance, replication policy 460 may indicate that cluster node 160 as a source node for application file(s) 150 and may also indicate cluster nodes 170 and 180 as target nodes to which application file(s) 150 should be replicated. As noted above, replication agent 130 may have modified replication policy 460 to indicate source and target nodes for replication based on status information received from clustering engine 120. So, replication agent 130 may, after consulting replication policy 460 replicate application file(s) 150 from cluster node 160 to cluster node 170 and 180, according to one embodiment. In one embodiment, replication agent 130 may replicate the entire contents of application file(s) 150, while in other embodiments replication agent 130 may only replicate portions of application file(s) 150. For instance, as described above, replication agent 130 may be configured to monitor changes made to application file(s) 150 and thus may be configured to only replicated the changed portions of application file(s) 150.

Additionally, replication policy 460 may indicated one or more application files or portions of application files and replication agent 130 may be configured to only replication those files or portions of files indicated in replication policy 460, according to one embodiment. Replication policy 460 may also indicate a frequency for replicating application files for application 140, in some embodiments. In one such embodiment, replication agent 130 may be configured to replicate application file(s) 150 according to the replication frequency indicated by replication policy 460. In other embodiments, however, replication agent 130 may be configured to monitor changes to application file(s) 150 and may also be configured to replicate changes to application file(s) 150 when they are detected. In yet other embodiments, replication agent 130 may be configured to check for changes in application file(s) 150 and to replicate any changes found according to a replication frequency indicated in replication policy 460.

Figure 9:
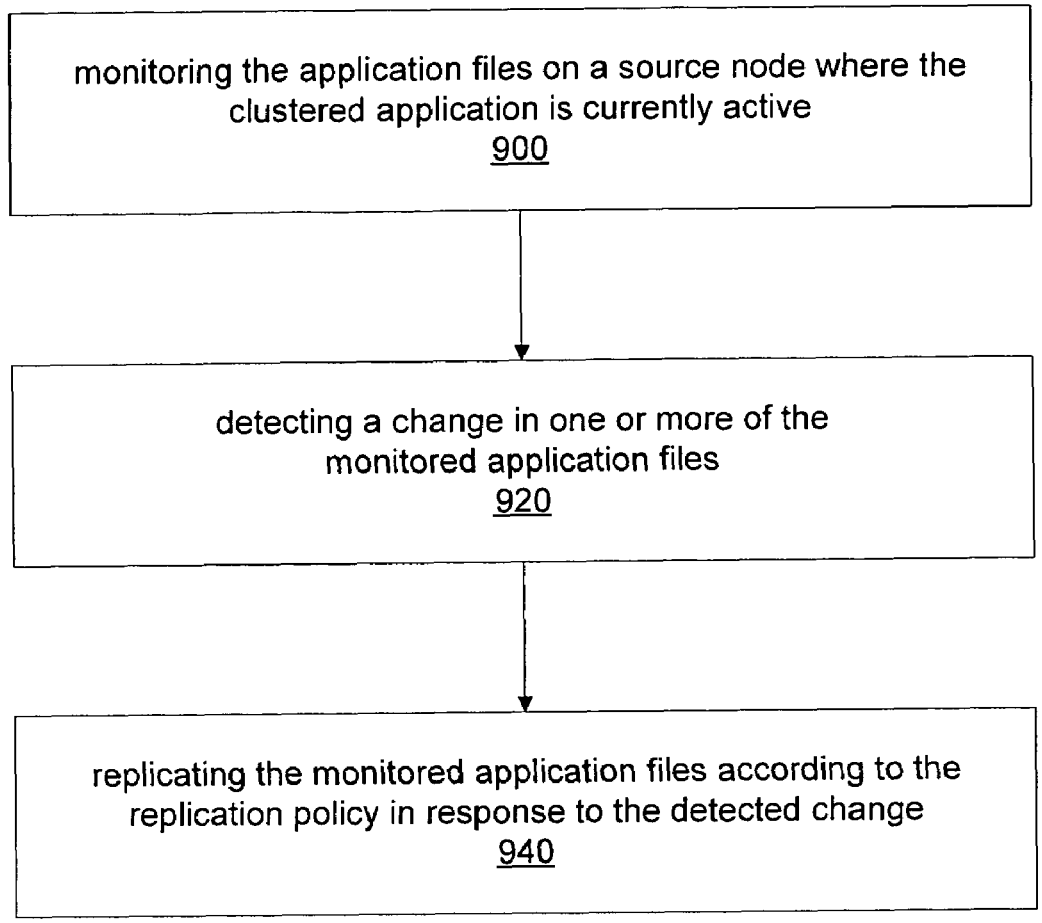
FIG. 9 is a flowchart illustrated a method for replicating application files in response to detected changes in the application files, in one embodiment.

FIG. 9 is a flowchart illustrated a method for replicating application files in response to detected changes in the application files, in one embodiment. According to some embodiments, a replication agent may monitor application files on a source node where the clustered application is currently active, as illustrated by block 900. As mentioned above, replication agent 130 may, in some embodiments, be configured to monitor application files, such as application file(s) 150, associated with application 140 on a cluster node where application 140 is currently active. In one embodiment replication agent 130 may use information in replication policy 460 to determine which node application 140 is currently active on. In another embodiment, replication agent 130 may use the status information received from clustering engine 120 to determine a source node. Replication agent 130 may monitor application file(s) 150 to determine when changes are made to them. In one embodiment replication agent 130 may determine which files to monitor based on information replication policy 460, while in other embodiments, replication agent 130 may use the status information received from clustering engine 120 to determine which files to monitor.

While monitoring application files, a replication agent may detect a change in one or more of the monitored application files, as illustrated by block 920, according to one embodiment. For example, application 140 may have modified one or more files of application file(s) 150, perhaps configuration files, and replication agent 130 may be monitoring application file(s) 150 and may detect the changes.

A replication agent may also, as illustrated by block 940, replicate the monitored application file according to the replication policy in response to the detected change. For example, replication agent 130 may detect changes to one or more application file(s) 150 and may replicate those changes from one cluster node to one or more other cluster nodes as indicated by replication policy 460. In one embodiment, replication agent 130 may replicate the detected changes as soon as those changes are detected. In other embodiments, however, replication agent 130 may adhere to a replication frequency indicated by replication policy 460. Replication agent 130 may also use a replication frequency indicated by replication policy 460 during monitoring application file(s) 150 for changes and may therefore only check for and replicate changes according to the replication frequency.

Figure 10:
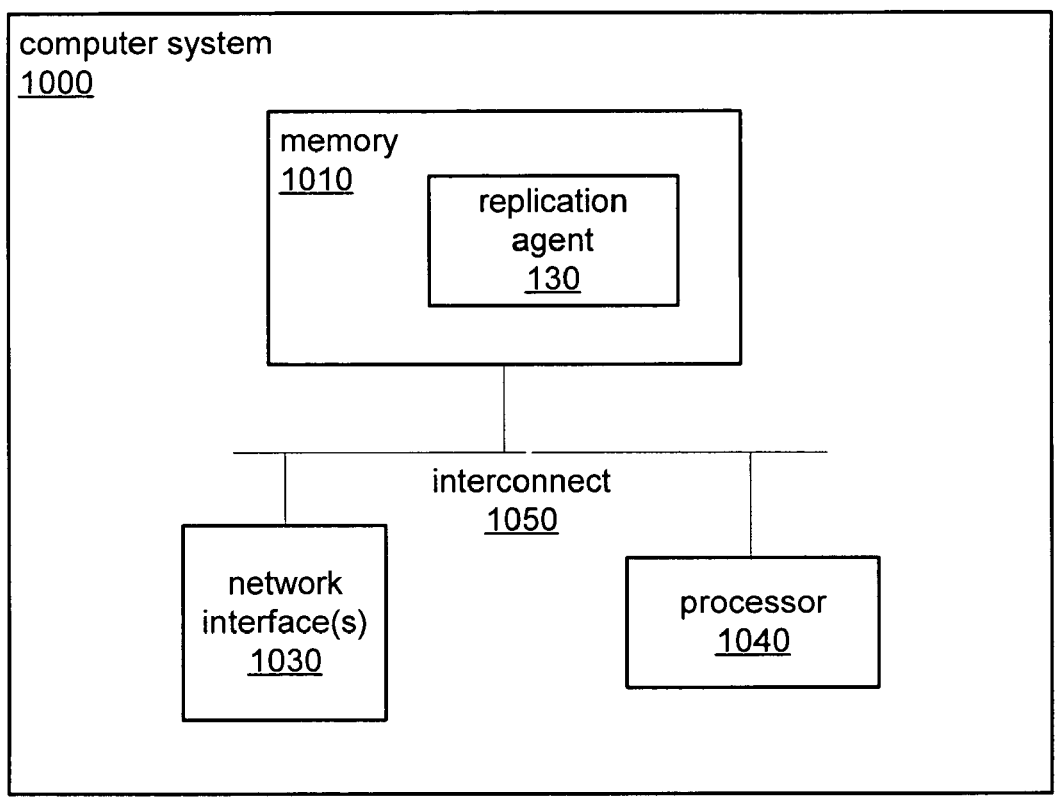
FIG. 10 is a block diagram illustrating a computer system capable of implementing automated replication in a clustered environment, according to one embodiment.

FIG. 10 illustrates a computing system capable of automating replication in a clustered environment as described herein and according to various embodiments. Computer system 1000 may be any of various types of devices, including, but not limited to, a personal computer system, desktop computer, laptop or notebook computer, mainframe computer system, handheld computer, workstation, network computer, a consumer device such as a mobile phone, pager, or any type of networkable peripheral device such as storage devices, switches, modems, routers, etc, or in general any type of networkable computing device. Computer system 1000 may include at least one processor 1040. Processor 1040 may couple across interconnect 1050 to memory 1010 and I/O interfaces 1030. I/O interfaces 1030 may be any of various types of interfaces configured to couple with and communicate with other devices, according to various embodiments. In one embodiment I/O interfaces 1030 may represent a network interface configured to couple with and communicate over network 100 illustrated in FIG. 1, described above.

Memory 1010 is representative of various types of possible memory media, also referred to as "computer accessible media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

In some embodiments, memory 1010 may include program instructions configured to automate replication in a clustered environment as described above. In certain embodiments memory 1010 may include program instructions configured to implement a replication agent, such as replication agent 130. In one embodiment, replication agent 130 may include program instructions configured to automate replication in a clustered environment. In another embodiment, memory 1010 may include program instructions configured to implement a clustering engine, such as clustering engine 120. In other embodiment, memory 1010 may include program instruction configured to implement both a clustering engine and a replication agent. In yet other embodiments, the clustering engine and replication agent may be distributed on different devices.

Although the embodiments above have been described in detail, numerous variations and modifications will become apparent once the above disclosure is fully appreciated. It is intended that the following claims be interpreted to embrace all such variations and modifications.

What is claimed is:

1. A method, comprising:
   receiving from a clustering engine status information regarding a clustered application configured to execute on two or more clustered computing nodes, and wherein the clustering engine is configured to manage the availability of the clustered application across the clustered computing nodes;
   modifying a replication policy for replicating one or more application files of the clustered application based on the received status information; and
   replicating, according to the modified replication policy, the application files from one of the clustered computing nodes to one or more others of the clustered computing nodes.

2. The method of claim 1, wherein the received status information comprises state change information indicating a source node of the clustered computing nodes on which the clustered application is active and wherein said replicating comprises replicating the application files from the source node to one or more others of the clustered computing nodes.

3. The method of claim 2, further comprising:
   monitoring the application files on the indicated source node;
   detecting a change in one or more of the monitored application files; and
   in response to said detecting, performing said replicating.

4. The method of claim 1, wherein the received status information indicates one or more target nodes of the clustered computing nodes on which the clustered application is configured to execute and wherein said replicating comprises replicating the application files to the indicated target nodes.

5. The method of claim 1, further comprising, prior to said receiving, registering with the clustering engine through a clustering API to receive the status information.

6. The method of claim 5, wherein a replication agent configured to execute on one or more of the clustered computing nodes performs said registering, said receiving, said modifying, and said replicating.

7. The method of claim 1, wherein the received status information comprises information indicating a replication frequency and wherein said modifying comprises modifying the replication policy according to the received replication frequency.

8. The method of claim 1, wherein the received status information comprises information indicating the one or more application files to be replicated.

9. The method of claim 1, wherein said receiving is in response to the clustering engine migrating the clustered application to a new one of the clustered computing nodes; wherein the status information includes state change information indicating a source node corresponding to the new one of the clustered computing nodes to which the clustered application was migrated.

10. A system, comprising:
    a plurality of clustered computing nodes;
    a clustered application, configured to execute on each of the clustered computing nodes;
    one or more application files for the clustered application;

a clustering engine configured to managing the availability of the clustered application on the clustered computing nodes; and a replication agent configured to:
receive from the clustering information regarding the clustered application;
modify a replication policy for replicating the application files based on the received a status information; and
replicate, according to the modified replication policy, the application files from one of the clustered computing nodes to one or more others of the clustered computing nodes.

11. The system of claim 10, wherein the received status information comprises state change information indicating a source node of the clustered computing nodes on which the clustered application is active and wherein in said replicating the replication agent is configured to replicate the application files from the source node to one or more others of the clustered computing nodes.

12. The system of claim 11, wherein the replication agent is further configured to:
monitor the one or more application files on the indicated source node;
detect a change in one or more of the monitored application files; and
in response to said detecting, perform said replicating.

13. The system of claim 10, wherein the received status information indicates one or more target nodes of the clustered computing nodes on which the clustered application is configured to execute and wherein in said replicating the replication agent is configured to replicate the application files to the indicated target nodes.

14. The system of claim 10, wherein the replication agent is further configured to, prior to said receiving, register with the clustering engine through a clustering API to receive the status information.

15. The system of claim 10, wherein the received status information comprises information indicating a replication frequency and wherein in said modifying the replication agent is configured to modify the replication policy according to the indicated replication frequency.

16. The system of claim 10, wherein the received status information comprises information indicating the one or more application files to be replicated.

17. The system of claim 10, wherein said receiving is in response the clustering engine migrating the clustered application to a new one of the clustered computing nodes; wherein the status information includes state change information indicating a source node corresponding to the new one of the clustered computing nodes to which the clustered application was migrated.

18. A computer accessible medium, comprising program instructions configured to implement:
receiving from a clustering engine status information regarding a clustered application configured to execute on two or more clustered computing nodes, and wherein the clustering engine is configured to manage the availability of the clustered application across the clustered computing nodes;
modifying a replication policy for replicating one or more application files of the clustered application based on the received status information; and
replicating, according to the modified replication policy, the application files from one of the clustered computing nodes to one or more others of the clustered computing nodes.

19. The computer accessible medium of claim 18, wherein the received status information comprises state change information indicating a source node of the clustered computing nodes on which the clustered application is active and wherein in said replicating the program instructions are further configured to implement replicating the application files from the source node to one or more others of the clustered computing nodes.

20. The computer accessible medium of claim 19, wherein the program instructions are further configured to implement:
monitoring the one or more application files on the indicated source node;
detecting a change in one or more of the monitored application files; and
in response to said detecting, performing said replicating.

21. The computer accessible medium of claim 18, wherein the received status information indicates one or more target nodes of the clustered computing nodes on which the clustered application is configured to execute and wherein in said replicating the program instructions are further configured to implement replicating the application files to the indicated target nodes.

* * * * *